United States Patent [19]

Steiner

[11] Patent Number: 4,762,406
[45] Date of Patent: Aug. 9, 1988

[54] MODULAR EYEGLASSES

[76] Inventor: Walter Steiner, Säntisstrasse 52, Brütten 8311, Switzerland

[21] Appl. No.: 809,896

[22] Filed: Dec. 17, 1985

[30] Foreign Application Priority Data

Dec. 24, 1984 [DE] Fed. Rep. of Germany ....... 3447369

[51] Int. Cl.⁴ ............................ E02C 5/12; E02C 5/04
[52] U.S. Cl. .................................... 351/154; 351/137; 351/128
[58] Field of Search ......................... 351/41, 55, 57, 58, 351/88, 124, 128, 132, 133, 134, 135, 137, 140, 147, 148, 149, 154

[56] References Cited

U.S. PATENT DOCUMENTS

| | | | |
|---|---|---|---|
| 3,709,587 | 1/1973 | Wick | 351/149 X |
| 3,846,017 | 11/1974 | Ferrell | 351/106 |
| 4,331,393 | 5/1982 | Bradley | 351/138 X |
| 4,405,213 | 9/1983 | Kolkmann | 351/55 X |

FOREIGN PATENT DOCUMENTS

| | | | |
|---|---|---|---|
| 335345 | 9/1930 | United Kingdom | 351/57 |
| 2000318 | 1/1979 | United Kingdom | 351/106 |

*Primary Examiner*—Rodney B. Bovernick
*Attorney, Agent, or Firm*—Tarolli, Sundheim & Covell

[57] ABSTRACT

Eyeglasses which have removable and replaceable lenses to meet individual vision requirements with respect to focal length and strength. In one embodiment, the lenses are slidably and removably mounted to a rod-like holding element. The position of the lenses relative to one another can be changed by sliding the lenses along the holding element. This allows the eyeglasses to accommodate differences in the eye spacing among people. The lenses can also be removed and replaced should an individual desire or need lenses of different focal lengths or strengths.

4 Claims, 3 Drawing Sheets

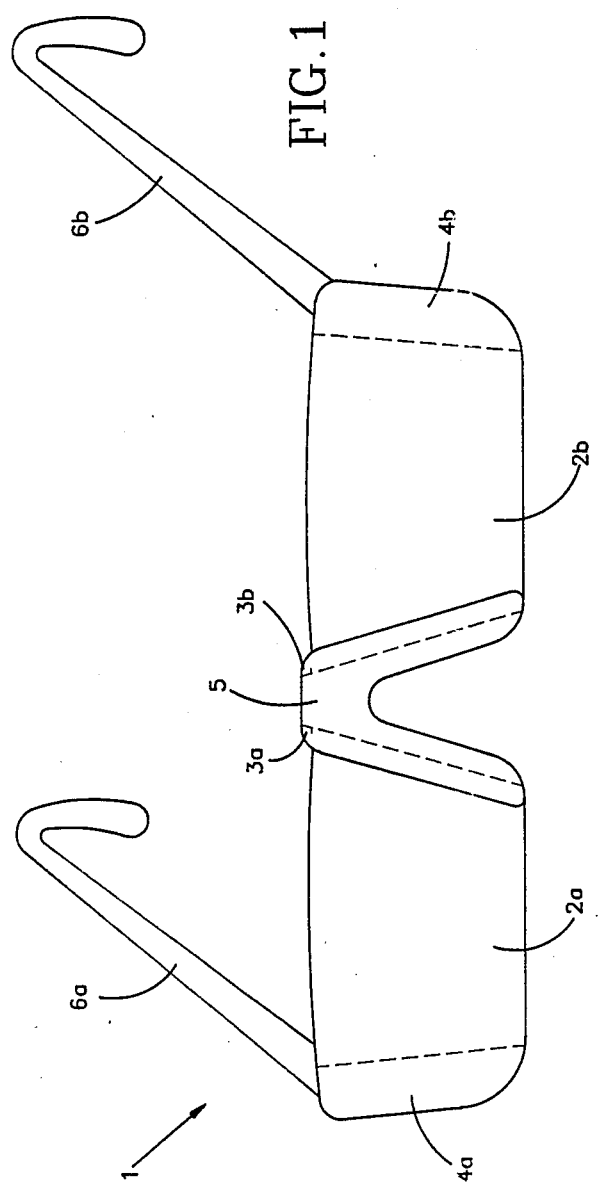

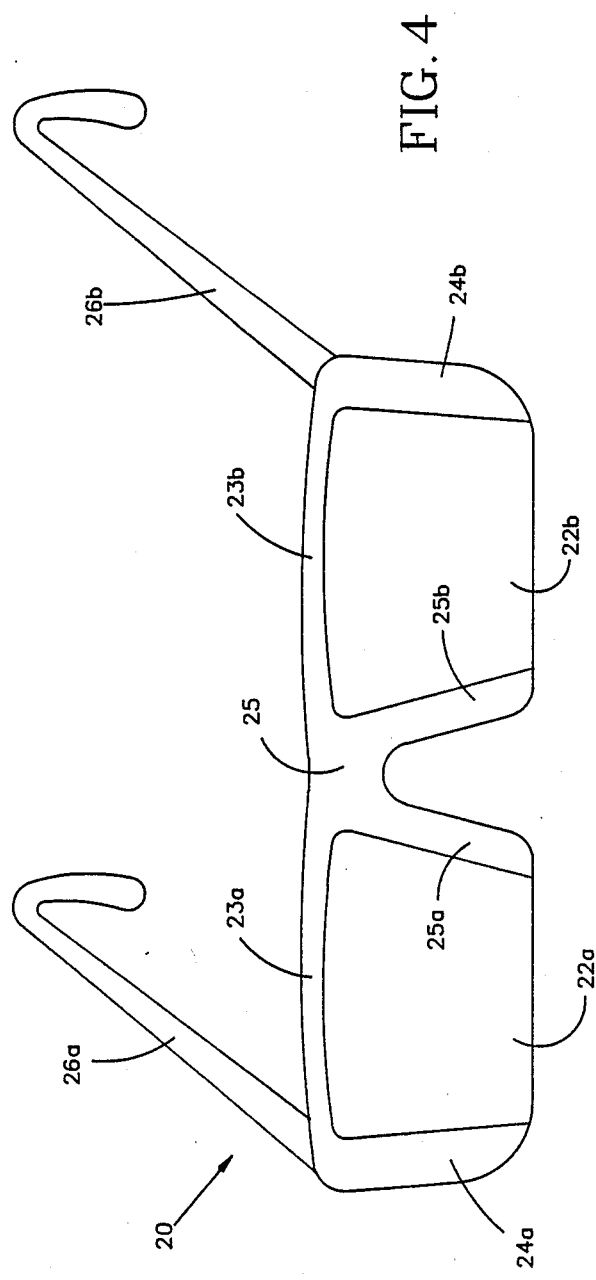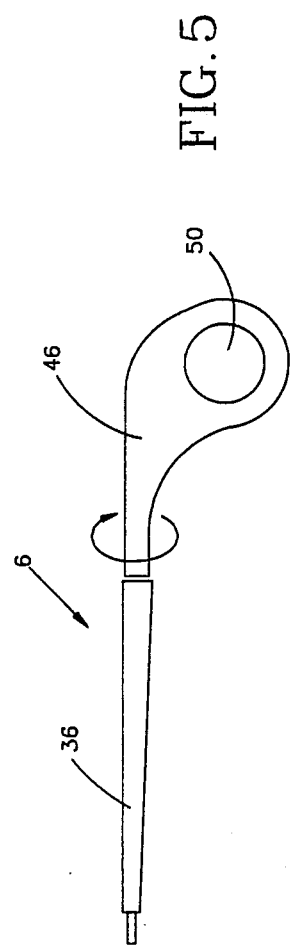

MODULAR EYEGLASSES

BACKGROUND OF THE INVENTION

The present invention relates to eyeglasses, and in particular to eyeglasses which can be assembled to meet a person's individual needs for seeing and wearing comfort.

There are known devices currently on the market which are merely two magnifying glasses held in front of a person's eyes by a standard eyeglass frame. Such devices enjoy increasing popularity, especially with older people, who often have trouble seeing small objects or fine print.

However, the vision in a person's eyes can often be quite different. Therefore, a need exists to provide reading glasses which can be tailored to meet a person's individual requirements. Also, the spacing between a person's eyes differs among people. Therefore, a need exists for reading glasses which can accommodate the variety of eye spacing distances that exist in people. Furthermore, since the shape of a person's nose also varies from one person to another, a need exists to provide a comfortable nose piece for eyeglasses to enable the glasses to be comfortably worn for extended periods of time.

The known devices that are available on the market do offer a person the ability to generally improve vision. However, these known eyeglasses do not consider the difference in vision between a person's eyes, the variability in spacing between people's eyes, and the difference in the shapes of people's noses. Therefore, it is the object of the present invention to provide eyeglasses which can be tailored to meet a person's individual vision requirements while being comfortable to wear for extended periods of time.

SUMMARY OF THE INVENTION

The present invention is eyeglasses assembled to meet a person's individual requirements. The eyeglasses are assembled from a selection of lenses which meet the individual vision requirements in a person's eyes. The eyeglasses are also assembled from a selection of components which meet the individual's eye spacing requirements and that person's nose shape. A particular feature of the present invention is that the individual may, should the need arise, exchange any of the components or lenses to meet any change in the above-mentioned individual requirements.

In one embodiment of the present invention, two lenses are removably mounted on opposite sides of a nose piece. A pair of earpieces are pivotally mounted to the outermost portions of the lenses. Thus, the lenses form an integral part of the eyeglass frame.

In another embodiment of the present invention, the nose piece and lenses are removably and slidably mounted to a rod-like holding element. A pair of earpieces are pivotally mounted to the end portions of the rod-like holding element. The distance between the lenses can then be adjusted by sliding the lenses along the rod-like holding element.

In another embodiment of the present invention, an eyeglass frame is formed of a deflectable material. Lenses are removably mounted in the frame by pushing the lenses into the deflectable portions of the frame. The lenses can be changed to meet individual lens strength requirements by removing the existing lens and replacing it with another.

A feature which can be used with any of the above-mentioned embodiments is that at least one of the earpieces has a magnifying glass installed. The magnifying glass will generally be of a strength much greater than the lenses in the eyeglasses. This permits a person to see even smaller objects or read even finer print.

BRIEF DESCRIPTION OF THE DRAWINGS

Further features and objects of the present invention will become apparent to those skilled in the art to which the invention relates from a reading of the following specification with reference to the accompanying drawings, in which:

FIG. 1 is a perspective view of a first embodiment of the present invention in which the lenses form an integral part of the eyeglass frame;

FIG. 2 is a partial top view of the eyeglasses in FIG. 1;

FIG. 4 is a perspective view of a third embodiment of the present invention illustrating a pair of lenses mounted in a frame made of deflectable material; and FIG. 5 is a side view of an earpiece having a magnifying glass installed therein.

DESCRIPTION OF AT LEAST ONE PREFERRED EMBODIMENT

Figure 3:
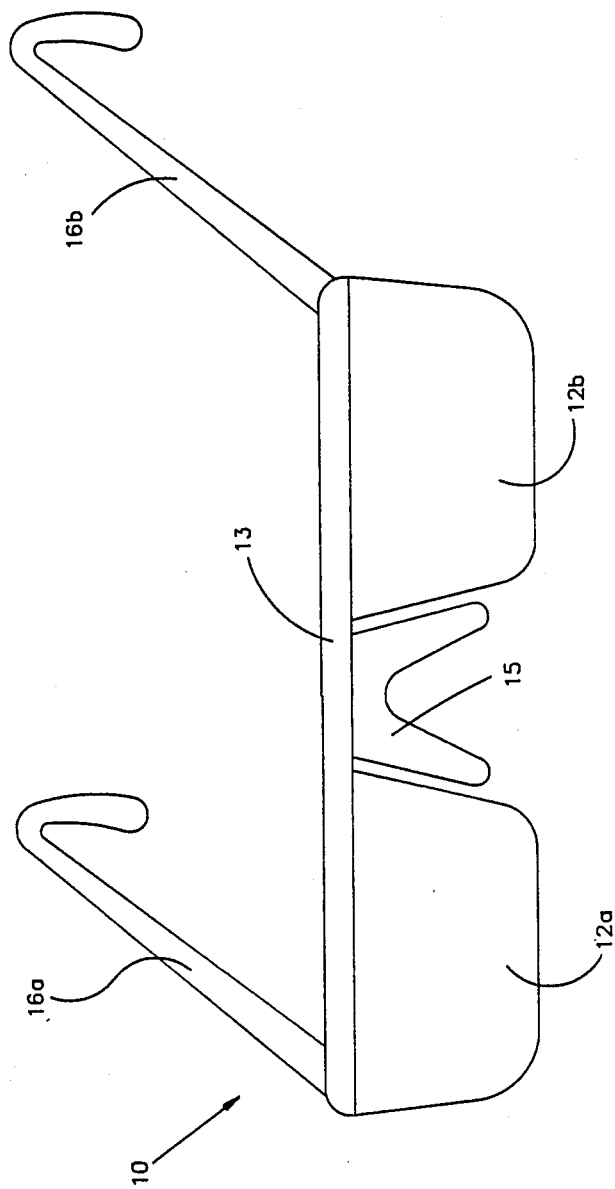
FIG. 3 is a perspective view of a second embodiment of the present invention illustrating lenses and a nose piece mounted to a rod-like holding element.

The eyeglasses 1 illustrated in FIG. 1 has two spaced apart lenses 2a and 2b removably mounted to holding portions 3a and 3b of the nose piece 5. The nose piece 5 has two legs extending from a bridge portion. The adjacent surfaces of the bridge and legs defines a surface that rests on a person's nose. Earpieces 6a and 6b are pivotally connected to mounting portions 4a and 4b of the lenses. The lenses 2a and 2b are held in front of a person's eyes when the nose piece 5 rests on a person's nose and the earpieces 6a, 6b are on the sides of a person's head resting on the ears.

As illustrated in FIG. 2, the removable mounting of the two lenses 2a and 2b to the nose piece 5 is accomplished by inserting the projecting portions 7a and 7b of the lenses into grooves formed in the mounting portions 3a and 3b of the nose piece. The projecting portions 7a and 7b as well as the earpiece mounting portions 4a and 4b are integrally formed with the lenses 2a and 2b. The lenses 2a and 2b are preferably molded of an economical plastic material.

The earpieces 6a and 6b are mounted to the mounting portions 4a and 4b of the lenses in a known manner, such as by means of a hinge which can either be adhesively bonded or screwed on. The eyeglasses 1 (FIG. 1) are designed so that they can be assembled by a person to meet the individual requirements of the wearer. The eyeglasses 1 are also designed so that any of the components can be removed and replaced with others to meet changing needs of the individual. For example, it is intended that the seller of the eyeglasses have a selection of the components available. That is, the seller will have a selection of lenses 2a, 2b which are of different focal length and strengths. The seller will also have a selection of nose pieces 5 which will have different spacing between the legs to accommodate different shapes of noses, and have different exterior spacing so that the different spacing between people's eyes can be accommodated. The earpieces 6a and 6b will also be offered in a variety of lengths to accommodate heads of different sizes. The lenses 2a, 2b, nose pieces 5, and earpieces 6a and 6b can be offered in a variety of colors and styles.

Therefore, the lenses 2a and 2b, nose piece 5, and earpieces 6a and 6b are selected and assembled to meet an individual's requirement for vision and size. Furthermore, if an individual needs or desires to change any of the components, they can selectively be changed at a relatively small cost. This is done by merely disassembling the component from the eyeglasses that is to be replaced and to reassemble the eyeglasses with another selected component.

FIG. 3 illustrates a second embodiment of the eyeglasses 10. The eyeglasses 10 have an elongated rod-like holding element 13. The holding element 13 can be made of metal or plastic and has a groove (not shown) extending along its bottom surface as viewed in FIG. 3. The nose piece 15 is slidably mounted in the groove in the holding element 13. A pair of lenses 12a and 12b are also slidably mounted in the groove in the holding element 13 on opposite sides of a nose piece 15. Earpieces 16a and 16b are pivotally connected to opposite end portions of the holding element 13.

A particular advantage exists in this embodiment of the present invention in that the lenses 12a and 12b are slidably mounted in the holding element 13. Therefore, the lenses 12a and 12b can be moved along the holding element 13 relative to one another and to the nose piece 15 in order to accommodate the different eye spacing among people. Furthermore, the lenses 12a and 12b, as well as the nose piece 15, can be removed and replaced as desired or as needed in the holding element 13 should a person's individual requirements change.

Again, the lenses 12a and 12b are selected as to their focal lengths and strengths from a seller's stock to meet individual vision requirements. A selection of nose pieces 15 having different spacing between the legs will also be provided by the seller. The holding element 13, nose piece 15, and earpieces 16a and 16b will be provided in a variety of colors and styles. Therefore, an individual may assembly eyeglasses to meet individual sight, comfort, and style requirements.

FIG. 4 illustrates a third embodiment of the eyeglasses 20. The lenses 22a and 22b are held in place by a frame having respective holding elements 23a and 23b, end portions 24a and 24b, and nose piece legs 25a and 25b. The frame is integrally molded, preferably of a deformably plastic material. Earpieces 26a and 26b are pivotally connected with respective end portions 24a and 24b.

The lenses 22a and 22b are again selected from a group of lenses provided by the seller having different focal lengths and strengths. The lenses 22a and 22b are mounted to the frame by inserting them into the deflectable plastic frame so that the frame grips around three of the edges of each lens 22a and 22b. The frame and earpieces 26a and 26b are provided by the seller in a variety of colors and styles. Also, the lenses 22a and 22b can be removed and replaced to meet the changing needs of the individual.

A further feature of the present invention is illustrated in FIG. 5. An earpiece 6, which can be used along with any of the above embodiments, is illustrated having a first portion 36 for connecting to the eyeglasses. A second portion 46 is rotatably mounted to the first portion 36. A magnifying glass 50, which is generally of greater strength than any of the lenses provided by the seller, is mounted in the second portion 46. The second portion 46 rests on the ear of a person. The eyeglasses 1, 10, 20, as described above, can have either one or two of the earpieces illustrated in FIG. 5.

Therefore, the present invention provides eyeglasses which can be assembled to meet individual sight, style, and wearing comfort requirements of an individual. Furthermore, should any of these requirements change, the present invention permits easy removal and replacement of any of the components comprising the present invention in order to meet the changing requirements of the individual.

Having described at least one preferred embodiment, the following is claimed:

1. Eyeglasses including:
   a pair of lenses;
   a nosepiece selected from a plurality of nosepieces;
   a holding element having a continuous groove for removably and slidingly receiving said nosepiece and said pair of lenses, each lens of said pair of lenses being located on a respective opposite side of said nosepiece;
   said nosepiece and said lenses being slidably movable along said continuous groove in said holding element to positions to accommodate the eye spacing of an eyeglasses wearer, said nosepiece and said lenses having surfaces engaging the surfaces defining said continuous groove to hold said nosepiece and said lenses in said positions; and
   said eyeglasses further including a pair of earpieces for supporting said eyeglasses on the ears of the eyeglasses wearer.

2. Eyeglasses as set forth in claim 1 wherein said nose piece comprises a bridge portion for supporting said nose piece on the eyeglasses wearer's nose and two leg portions located on opposite sides of said bridge portion, each of said leg portions having an inwardly facing surface for resting on a side of the eyeglasses wearer's nose, and said nose piece is selected from a group of nose pieces having different distances between said inwardly facing surfaces.

3. Eyeglasses as set forth in claim 1 wherein at least one of said earpieces further includes a magnifying lens rotatably mounted in a portion of said earpiece.

4. Eyeglasses as set forth in claim 1 wherein said lenses are selected from a group of lenses having different strengths and focal lengths.

* * * * *